T. E. MURRAY.
METAL VEHICLE WHEEL.
APPLICATION FILED JUNE 28, 1916.

1,220,769.

Patented Mar. 27, 1917.

Inventor
Thomas E. Murray
By his Attorney
Park Benjamin

UNITED STATES PATENT OFFICE.

THOMAS E. MURRAY, OF NEW YORK, N. Y.

METAL VEHICLE-WHEEL.

1,220,769.

Specification of Letters Patent.

Patented Mar. 27, 1917.

Original application filed February 18, 1916, Serial No. 79,050. Divided and this application filed June 28, 1916. Serial No. 106,318.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists in the construction more particularly hereinafter set forth, of the means for uniting the spokes to the rim, and also the means for preventing lateral displacement of the tire on said rim.

This application is a division of my application for Metal Vehicle Wheels, Serial No. 79,050, filed February 18, 1916.

In the accompanying drawings—

Figure 1:
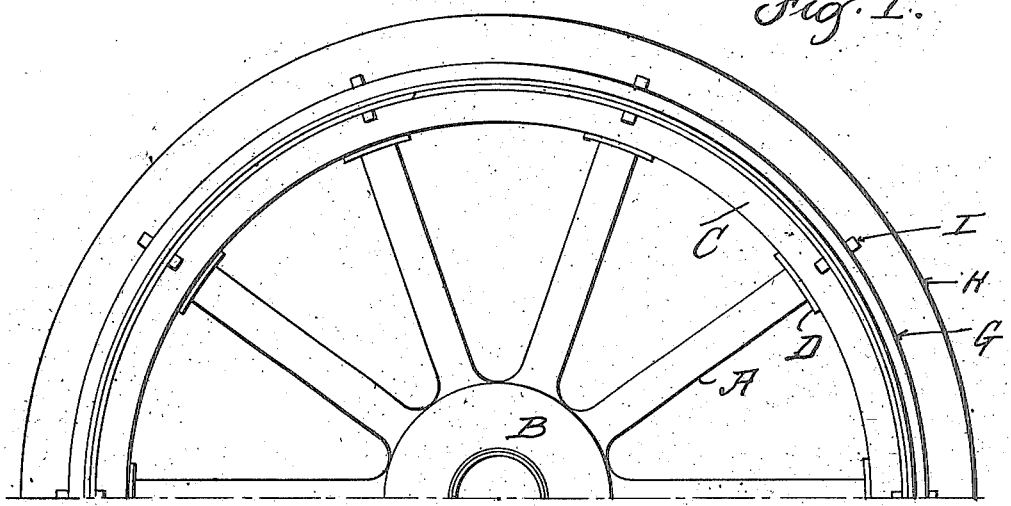
Figure 2:
Figure 3:
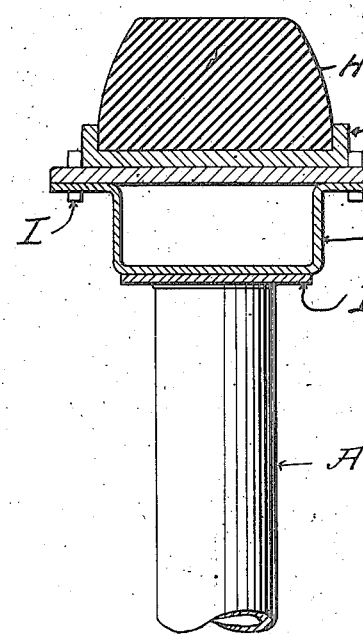
Figure 4:
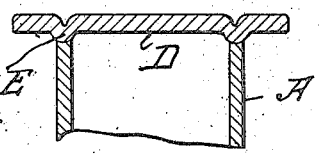
Figure 5:
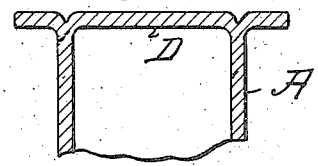
Figure 6:
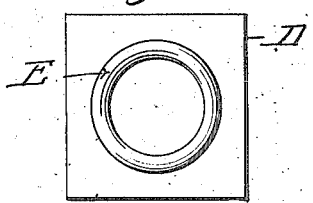

Figure 1 is a face elevation of one-half of a wheel embodying my invention. Fig. 2 shows in perspective and separately one of the tubular spokes. Fig. 3 shows the rim in transverse section with the spoke united thereto. Fig. 4 shows in section the outer end of the spoke in contact with the annular rib on the under side of the rim before welding. Fig. 5 shows the same after welding. Fig. 6 is a plan view of one of the spoke flange plates.

Similar letters of reference indicate like parts.

The spokes A are tubular, and each is united to the hub B in any well known way. The rim C is of U-shaped cross section, having a flat bottom and side flanges. On the under side of said rim are spot-welded a plurality of plates D, corresponding in number to the spokes A. On each plate is formed, preferably by striking up the metal of said plate, a circular rib E. The ends of the spokes register with said ribs, as shown in Fig. 4. When a welding current is passed through the joint between spoke and rib, the rib is fused, and the spoke and plate D are thus united, as shown in Fig. 5. The plates D may be first welded to the rim C and the spokes then applied, as described, to the circular rib E: or the plates D may be first applied to the spokes and welded, and said plates afterward welded upon the rim.

Upon the U-shaped rim C, I place a circular band F which is welded to the flanges of said rim. On said band is an annular flanged plate G which receives the tire H. Lateral movement of the plate G on band F is prevented by pins I entering said band and the rim flanges.

I claim:

1. A vehicle wheel, comprising tubular spokes, a plate welded to the outer end of each spoke to close said end and to form a flange around the same, and a rim; the said plate being secured to said rim.

2. A vehicle wheel, comprising tubular spokes, a rim, and, on the inner side of said rim, annular ribs registering with and welded to the outer butt ends of said spokes.

In testimony whereof I have affixed my signature in presence of two witnesses.

THOMAS E. MURRAY.

Witnesses:
GERTRUDE T. PORTER,
MAY T. McGARRY.